United States Patent

[11] 3,593,272

| [72] | Inventors | Robert W. Blomenkamp<br>Palo Alto, Calif.;<br>Enrique J. Klein, 947 Alice Lane, Menlo Park, Calif. 94025 |
|---|---|---|
| [21] | Appl. No. | 763,672 |
| [22] | Filed | Sept. 30, 1968 |
| [45] | Patented | July 13, 1971 |
| [73] | Assignee | Enrique J. Klein<br>Menlo Park, Calif.<br>by said Robert W. Blomenkamp |

[54] SYSTEM FOR AUTOMATICALLY SENSING AND INDICATING A DECREASE IN THE ACCELERATION OF A VEHICLE
7 Claims, 6 Drawing Figs.

[52] U.S. Cl............................................. 340/62,
340/262, 340/271, 340/52
[51] Int. Cl........................................................ B60q 1/50,
G01p 15/08
[50] Field of Search............................................. 340/58,
263, 262, 271, 259, 62

[56] References Cited
UNITED STATES PATENTS
| 2,980,369 | 4/1961 | Ruof............................. | 340/58 X |
| 3,364,384 | 1/1968 | Dankert....................... | 340/62 X |

*Primary Examiner*—John W. Caldwell
*Assistant Examiner*—Howard S. Cohen

ABSTRACT: Apparatus for the determination of a reduction in acceleration of a vehicle in which an electromechanical sensing device generates an output signal in response to the rotation of a shaft turning at a fixed ratio to the vehicle drive shaft. Electronic circuitry processes the signal of the sensing device for controlling the operation of a light signal when a given level of reduction in acceleration is exceeded. The indicating system is integrated with the conventional vehicle light signals.

INVENTORS
E. J. KLEIN AND R. W. BLOMENKAMP
ATTORNEY

INVENTORS
E. J. KLEIN AND R. W. BLOMENKAMP
ATTORNEY

SYSTEM FOR AUTOMATICALLY SENSING AND INDICATING A DECREASE IN THE ACCELERATION OF A VEHICLE

If one motorized vehicle follows closely behind the other in dense traffic, the driver of the following vehicle responds to perceived changes in the speed of the leading vehicle and attempts to keep the speed difference between his and the leading vehicle at a minimum so as to follow in a safe and stable manner. The following driver's response mechanism, which terminates in his actuation of the brake or the accelerator, will be set in action by his perception of external stimuli. Drivers will vary in experience and state of alertness and therefore, the obviousness of the external stimuli will determine whether it is perceived and also affect the reaction time. Normally, to appraise a change in the velocity of the leading vehicle, a following driver must presently rely only on: (a) the range-finder capabilities of his eyes, and (b) stop lights, if the driver of the leading vehicle applies the brakes.

The present invention relates to improvements in means for signalling from one motorized vehicle to its follower when it is reducing its acceleration. A reduction in acceleration described a condition in which the magnitude of the acceleration becomes continuously smaller. This occurs, for example, while a vehicle that has been accelerating reaches a constant speed. A typical case in which this condition can represent a traffic safety hazard is that of two vehicles following each other closely while accelerating at approximately the same rate. As the leading vehicle decreases its acceleration towards a constant speed, no signal of such a change is given to the following driver, and if this driver does not decrease his acceleration correspondingly, the two vehicles will draw closer together possibly causing a rear end collision. It is clear that if a signal of a vehicle's reduction in acceleration were given to the following driver, this driver would in many cases gain sufficient time to respond effectively and avoid an accident. The danger of such situations is magnified in fast traffic with closely following vehicles, as encountered in our modern freeways, or when driving on icy roads where the use of the vehicle's brakes may not be desirable.

This traffic safety hazard has been recognized in the past, but until now, no means have been proposed to provide the necessary sensing and signalling devices to combat this hazard.

An object of the present invention is to provide an effective system for sensing the reduction in acceleration of a vehicle.

Another object of this invention is to signal the condition of a reduction in acceleration to a following vehicle driver.

Yet another object of this invention is to provide a fully automatic decrease in acceleration sensing and signalling system which requires no attention from the vehicle driver.

Still further objects and advantages will appear in the more detailed descriptions given below. Preferred forms of the present invention are shown in the accompanying drawings wherein.

Figure 1:
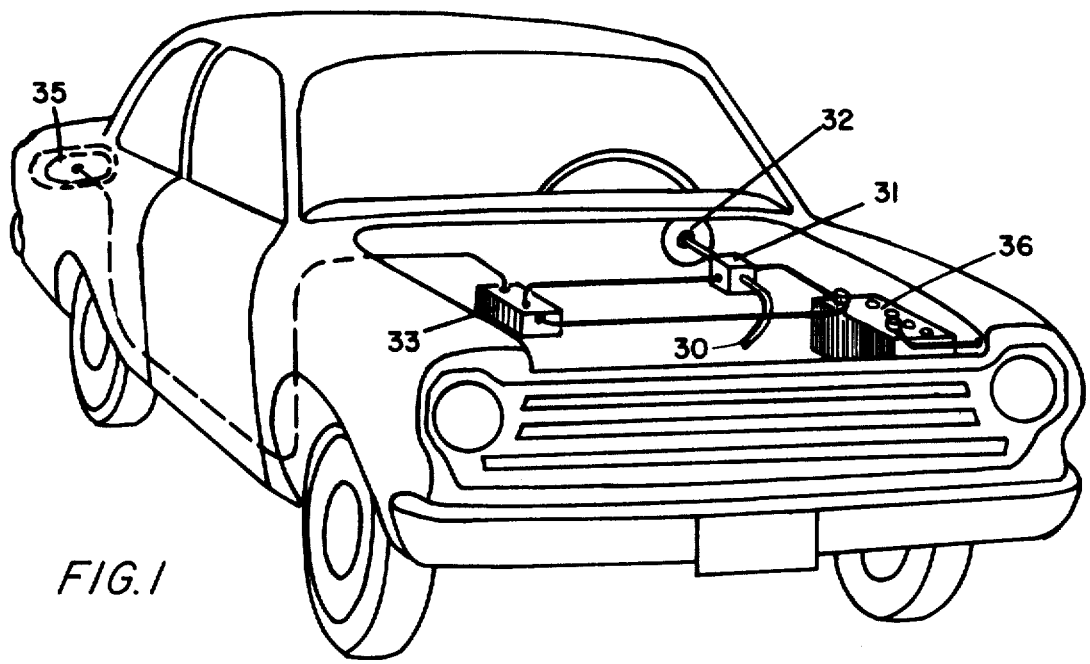
FIG. 1 is a perspective view of an automobile having the components of the sensing and signalling system of the present invention installed therein.
Figure 2:
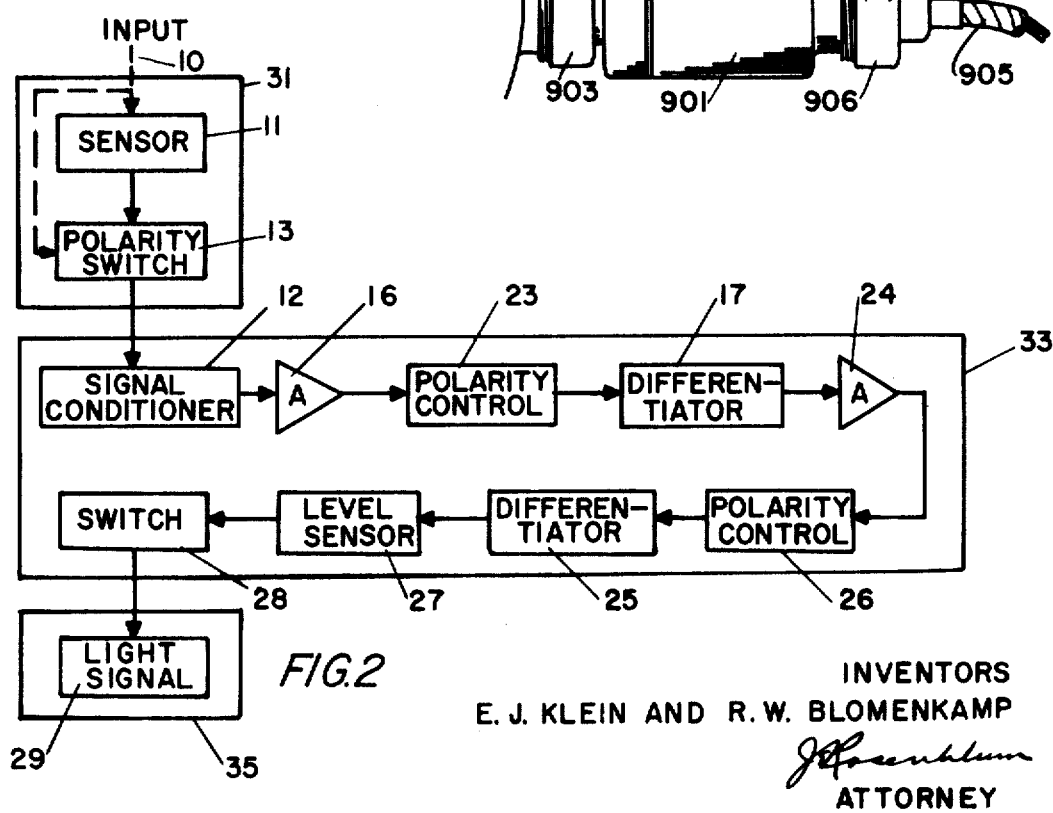
FIG. 2 is a block diagram of a complete sensing, DC signal processing and indicating system in accordance with the present invention.

Reference is now made to the drawings of FIG. 1 and FIG. 2 for the description of the principal parts of this invention and their functions. Reference is made later to the drawings of FIGS. 3, 4, 5, and 6 for detailed descriptions of the components of a preferred embodiment of this invention.

The automobile in FIG. 1 has its hood removed and shows schematically the principal components and component blocks of the present invention. The input signal is provided by the speedometer cable 30 which drives both a sensor inside an enclosure 31, as well as the automobile speedometer 32. Enclosure 31 is shown close to the speedometer 32 for convenience of illustration; a more suitable location would be at the speedometer cable takeoff at the transmission of the vehicle (see FIG. 3). The electrical signal from the sensor in enclosure 31 is then carried to an enclosure 33 which contains electronic processing means. The electrical output of the circuitry in the enclosure 33 operates a switch at a given level of reduction in acceleration of the vehicle, which then activates light signals incorporated in fixtures, such as fixtures 35, at the rear of the automobile.

A switching device sensitive to the forward or backward motion of the automobile is also contained in the enclosure 31. The DC power supply required for the operation of the electronic processing circuitry in the enclosure 33, and for the light signals such as those in fixture 35, is provided by the automobile battery 36 and its generator.

In the block diagram of FIG. 2, the components of this invention are subdivided in terms of their functions and their interdependence is shown. The devices shown schematically in FIG. 1 are identified in FIG. 2 by rectangular blocks carrying the same numeration. Box 31 contains a sensor 11 and polarity switch 13; box 33 contains a signal conditioner 12, an amplifier 16, a polarity control 23, a differentiator 17, another amplifier 24, another polarity control 26, a second differentiator 25, a level sensor 27, and a switch 28. Fixture 35 incorporates a light signal 29 activated from the signal processing circuitry in the box 33.

The mechanical input 10, to the sensor box 31, is the rotation of the drive shaft to the wheels of the vehicle or the rotation of any other shaft turning at a fixed ratio to the drive shaft. Thus the change in angular velocity of this shaft will accurately reflect the acceleration and deceleration of the vehicle, except when the driving wheels are slipping or spinning on the ground. This mechanical input then drives the sensor 11 which produces an electrical signal directly related to the mechanical input 10. The polarity switch 13 is governed by the mechanical input 10. It works like an on-off switch disconnecting the electrical signal of sensor 11 from the electronic signal processing circuitry when input 10 corresponds to a reverse motion of the vehicle, and reconnecting the signal to the processing circuitry in the forward motion of the vehicle.

The signal generated by the sensor 11 is electronically modified in the signal conditioner 12 to provide a suitable input to the rest of the signal processing circuitry. It then passes through the amplifier 16, which provides it with sufficient gain to drive the differentiator circuit 17. The output from the amplifier 16 still corresponds to input 10 and a differentiated signal would be proportional to the first time derivative of that input. Therefore, since input 10 represents the angular velocity of a shaft corresponding to the velocity of the vehicle, a differentiated signal would correspond to the angular acceleration or deceleration of that shaft, or the acceleration or deceleration of the vehicle. The polarity control 23 causes only signals increasing with time, corresponding to vehicle acceleration, to be processed by the differentiator circuit 17 and then amplified by amplifier 24. A second differentiation of the output signal from the amplifier 24 would correspond to the increase or decrease of the vehicle acceleration. The polarity control 26 causes only signals decreasing with time, corresponding to a decrease in vehicle acceleration, to be processed by the differentiator circuit 25 and then applied to the level sensor 27. This, in turn, operates the switch 28 which energizes the light signal 29. When the decrease in vehicle acceleration reaches a predetermined magnitude, the level sensor switches on the light signal providing a visual indication to the following driver.

The principal parts of this invention have thus been described in connection with FIG. 1, and the functions of these parts have been described in connection with FIG. 2. A detailed description is given next of the components for a preferred embodiment of this invention.

Figure 3:
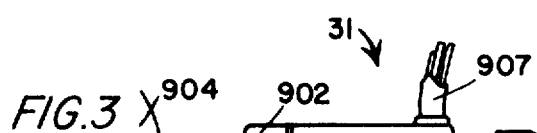
FIG. 3 is an elevational view of an electrical sensor and a mechanical switching device mounted to be driven by the transmission of the vehicle for use in the system of FIG. 2.

In FIG. 3, the electrical sensor 901 corresponds to the sensor in block 11 of FIG. 2, and the mechanical switching device 902 corresponds to the polarity switch in block 13 of FIG. 2. Devices 901 and 902 can be fabricated to form one assembly which can then be attached at one end, by means of the nut 903, to the transmission housing 904 of the vehicle, while at the other end, the speedometer cable 905 can be attached to the assembly by means of nut 906. The electrical sensor 901 and the mechanical switching device 902 are preferably mounted on a common shaft which is then directly coupled to the speedometer cable takeoff at the transmission and to the speedometer cable itself. Electrical conductors corresponding to both the sensor and the switching device are represented by 907.

Figure 4:
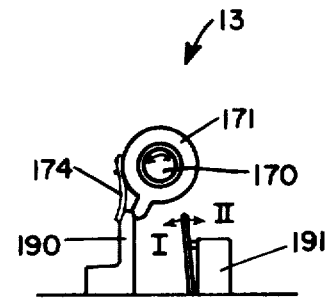
FIG. 4 is a transverse sectional view of a mechanical switching device, responsive to sense of rotation, for use in the system of FIG. 2.

A mechanical switching device responsive to sense of rotation, shown in FIG. 4, corresponds to the polarity switch in block 13 shown schematically in FIG. 2. This switch utilizes a frictional drag principle as disclosed and claimed in our copending application Docket No. KL-101, filed concurrently herewith. In FIG. 4, a shaft 170 turning at a fixed ratio to the drive shaft to the vehicle wheels has a slip ring arrangement 171 in which the shaft 170 can rotate freely. The slip ring 171 is restricted to a fixed position in the direction of the shaft axis. The slip ring 171 has a projection which can abut either against a fixed support 190 or the reed of a conventional, normally closed, on-off type microswitch 191. A spring 174 provides a biasing force to maintain the slip ring projection against the fixed support 190. When the shaft 170 rotates in the direction corresponding to the forward motion of the vehicle, i.e., clockwise in FIG. 4, the frictional drag between the shaft 170 and the slip ring 171 (transmitted by a viscous oil or grease) and the force exerted by the spring 174, both act to keep the projection of the slip ring 171 pressed against the fixed support 190 so that the reed of microswitch 191 is in position 1, the closed position. When the shaft rotates counterclockwise, corresponding to a reverse motion of the vehicle, the frictional drag between the shaft 170 and the slip ring 171 overcomes the force of spring 174 and the slip ring projection pushes the reed of microswitch 191 into position 11, the open position. When the shaft does not rotate, the force exerted by the spring 174 maintains the slip ring projection against the fixed support 190. The microswitch 191 opens and closes a contact carrying the output signal from the sensor 11 to signal processing circuitry as in box 33, in FIG. 2.

Figure 5:
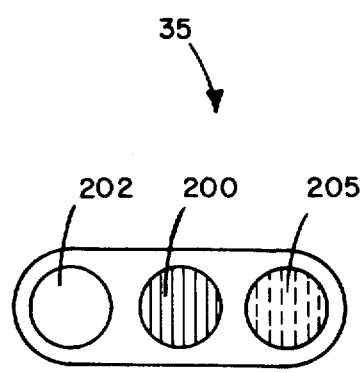
FIG. 5 is an elevational view of a composite tail light assembly for a vehicle, for use in the system of FIG. 2.

A composite tail light assembly shown in FIG. 5 corresponds to the fixture in block 35 shown schematically in FIG. 2. In FIG. 5 three light signals are mounted in one compartmental assembly. The light signal mount 200 comprises a red lens and a double-filament lamp. The first filament is used as a conventional running tail light and the second filament is a conventional stop light controlled by a brake-actuated switch. The light signal mount 202 comprises a colorless lens and a single filament lamp which is turned on when the vehicle goes into reverse motion. The light signal mount 205 comprises a preferably violet lens and a single filament lamp which becomes energized at a given threshold level of decrease in acceleration.

Figure 6:
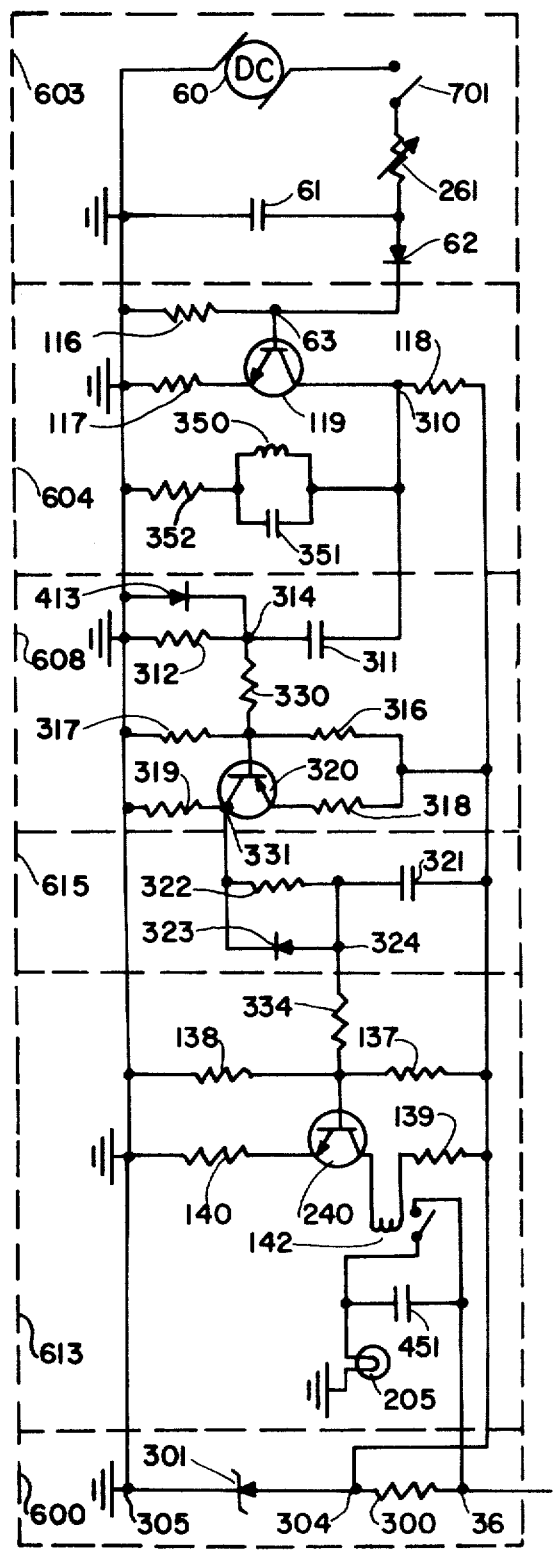
FIG. 6 is a schematic diagram of a sensing, signal processing and indicating circuits, for use in the system of FIG. 2.

The schematic representation in FIG. 6 is a preferred embodiment of a sensing, signal processing and indicating system of the present invention. In FIG. 6, circuitry and components enclosed by a broken line frame perform one or more functions corresponding to those of the more general block diagram of FIG. 2. Each one of these blocks can be considered as an interchangeable module. Alternative modules are mentioned later in this specification following the complete description of this preferred embodiment.

In FIG. 6, block 600 contains a resistor 300 and a zener diode 301 which provide a constant DC supply voltage $V_{cc}$ between terminals 304 and 305 for the rest of the electronic circuitry. The DC voltage E at terminal 36 can be supplied by a battery and either a DC power generator or an AC power generator followed by a full-wave rectifier.

Block 603 comprises a small DC generator-sensor 60 driven by a shaft turning at a fixed ratio to the drive shaft to the vehicle wheels, such as the speedometer cable. Sensor 60 produces an electrical DC signal output which is substantially proportional to the angular velocity of the input. Block 603 also contains a signal conditioner circuit including a variable resistor 261 and a capacitor 61 which form a low-pass filter for the electrical signal output of the sensor 60. The polarity switch 701 ensures that only signals corresponding to the forward motion of the vehicle are passed through the rest of the circuitry. A preferred embodiment of switch 701 is described in connection with FIG. 4. In addition to the polarity switch 701, the diode 62 only allows passage of signals above a minimum magnitude.

The circuitry of block 604 represents an amplifier comprising resistors 116, 117, and 118 and the NPN transistor 119. It also includes an LRC-type filter formed by an inductor 350, a resistor 352 and a capacitor 351. In block 604, the signal from block 603 is amplified and then smoothed by the filter.

In block 608, the circuit represents a polarity control and a signal differentiator connected to a single stage amplifier. An RC-type differentiator is formed by a capacitor 311 and a resistor 312, which is connected through a decoupling resistor 330 to the amplifier comprising the resistors 316, 317, 318, 319 and the PNP transistor 320. The input signal for the circuit of block 608 is obtained from terminal 310 (in block 604). The diode 413, shunting resistor 312 of the RC circuit, allows only input signals increasing with time to be processed by the circuit in block 608. Therefore, differentiated and amplified signals indicating only acceleration of the vehicle will appear at terminal 331 in block 608.

The circuit in block 615 represents another polarity control and another signal differentiator. An RC-type differentiator is formed by a capacitor 321 and a resistor 322. The diode 323, shunting resistor 322 of the RC circuit, allows only input signals decreasing with time, from terminal 331, to be processed by this differentiating circuit. Therefore, the signal at terminal 324 will correspond to a decrease in acceleration.

The circuit in block 613 represents a lever sensor and switch which activate a light signal. The level sensing circuit is formed by the decoupling resistor 334 and by resistors 137, 138, 139, 140 and the NPN transistor 240. The coil of a relay 142 is connected on the collector side of the transistor 240. The relay circuit includes a capacitor 451 and a lamp 205, which corresponds to the single filament lamp in light signal mount 205 shown in the compartmental assembly of FIG. 5. The level sensing and switching circuit of block 613 controls the switching of lamp 205 at a given threshold value of decrease in acceleration.

Having thus described all components and their functions in a preferred embodiment of this invention, a description will be given next of the operation of this device when installed in a vehicle.

Referring to the schematic diagram of FIG. 6, the device becomes fully operational when a voltage E is applied to the terminal 36 in block 600. With the vehicle stationary, switch 701 in block 603 connects the sensor 60 in block 603 to the rest of the signal processing circuitry. However, no signal is generated by the sensor 60 and the circuit remains inactive. As the vehicle starts its forward motion and accelerates, a signal is generated by the sensor 60 and if it is large enough to pass the diode 62 in block 603, it is amplified and smoothed out by the circuit in block 604. Since the vehicle is accelerating, the signal at terminal 310 is increasing with time and diode 413 in block 608 permits the signal to be differentiated and then amplified in the circuit of block 608. The resulting signal at terminal 331 is applied to the circuit of block 615. If the acceleration of the vehicle is increasing with time, diode 323 in block 615 will prevent the signal from being processed by the circuit in block 615. However, if the acceleration of the vehicle is decreasing, the signal from terminal 331 will be differentiated in the circuit of block 615. The resulting signal is then applied to the circuit of block 613. If the base current of the transistor 240 in block 613 reaches its threshold value, the transistor is turned on and the relay 142 becomes energized, switching on the decrease in acceleration indicating lamp 205 at the rear of the vehicle. As the reduction in acceleration of the vehicle becomes less pronounced, i.e., as the vehicle approaches a constant speed, the magnitude of the signal at terminal 324 is gradually reduced causing the base current of transistor 240 to fall below its threshold value, turning off the collector current through it, deenergizing the relay 142 and switching off lamp 205.

As the vehicle travels forward at a constant speed, the signal at terminal 310 is also constant and when applied to the differentiating circuit in block 608 results in a zero signal so that the rest of the circuitry will remain inactive.

As the vehicle decelerates, starting from a constant forward speed, the signal at terminal 310 decreases with time, and diode 413 prevents the signal from being processed by the circuit in block 608. This results in a zero signal at terminal 331 so that the rest of the circuitry will remain inactive.

When the vehicle moves in reverse starting from a stopped position, switch 701 in block 603 disconnects the sensor 60 from the rest of the signal processing circuitry. When the vehicle stops after its reversing motion, switch 701 reconnects sensor 60 to the rest of the circuitry.

Having thus described in detail the components and the operation of a complete preferred embodiment of this invention, components for alternative embodiments will be disclosed next making reference to replacement modules for those shown in FIG. 6.

Replacement modules for the DC generator sensor and signal conditioner circuit of block 603 in FIG. 6 could comprise (1) an AC generator sensor, (2) a magnetic rotor sensor, and (3) a light beam interrupting sensor, each with its signal conditioner circuit. The sensor itself can be driven by any of various ramifications of the drive shaft to the vehicle wheels. Typical installations would consist of (1) a sensor driven directly or through coupling elements by the speedometer cable or the transmission drive to it, and (2) a sensor driven through coupling elements by the drive shaft to the vehicle wheels.

Some typical replacement modules for the level sensor and switch of block 613 in FIG. 6 could make use of (1) a power transistor, replacing the transistor 240 and relay 142, (2) a modified Schmitt trigger incorporating a power transistor, a relay, or a glass semiconductor threshold switch, (4) a monostable multivibrator circuit using a relay or a glass semiconductor threshold switch, and (5) and SCR (silicon-controlled rectifier) as a level sensor and switching device when an AC power supply is available.

Detailed descriptions of replacement modules having the above characteristics are given in our copending application Docket No. KL-101, filed concurrently herewith.

The above-described system for indicating a decrease in acceleration may be combined with the system for indicating levels of acceleration and deceleration as disclosed and claimed in our said copending application.

In the specific embodiments described in this specification, the sensor and the signal conditioner module 603 (FIG. 6) produced a DC signal of a magnitude representative of the speed of the vehicle. However, the general principles of this invention are applicable also to systems in which the sensor and signal conditioner module produces a pulse or AC signal of a frequency representative of the speed of the vehicle. Specific embodiments utilizing such an AC signal are disclosed and claimed in our copending application Docket No. KL-103, also filed concurrently herewith.

While only one preferred form of this invention has been disclosed in detail, it is understood that his description is given by way of illustration and explanation only and not by way of limitation, since various changes therein may be made by those skilled in the art without departing from the scope and spirit of this invention.

Having thus described the invention, what we claim is:

1. A system for automatically sensing and indicating a decrease in acceleration of a vehicle, comprising: first means for obtaining a signal representative of the acceleration of said vehicle; second means for differentiating said acceleration signal with respect to time to provide an acceleration decrease signal; and indicator; and third means responsive to said decrease signal for actuating said indicator only when said decrease signal has a magnitude greater than a predetermined threshold magnitude.

2. A system according to claim 1 wherein said first means include means for generating a vehicle speed signal; and means for differentiating said speed signal.

3. A system according to claim 2 wherein said speed signal is derived from the angular velocity of a shaft rotatable in correlation with the wheels of said vehicle, and further including switching means controlled by the rotation of said shaft for transmitting said speed signal to said system only when said wheels are operating in forward drive.

4. A system according to claim 3 including a sleeve surrounding said shaft and rotatable in frictional drag relationship therewith, said switching means being closed by partial rotation of said sleeve in one sense for transmitting said speed signal when said wheels are operating in forward drive; means biasing said sleeve in said closed position whereby said switching means is opened, and transmission of said speed signal interrupted, only upon rotation of said shaft in the opposite sense when said wheels are operating in reverse drive.

5. A system according to claim 1 wherein said second means comprises an RC circuit in which said decrease signal is obtained at a resistor connected in shunt with a diode arranged with a polarity for blocking signals increasing in magnitude with time.

6. A system according to claim 1 wherein said indicator presents a visual indication external of said vehicle to drivers following said vehicle.

7. A system according to claim 2 wherein said means for differentiating said speed signal comprises an RC circuit in which the differentiated signal is developed across a resistor connected in shut with a diode arranged with a polarity for blocking signals decreasing in magnitude with time.

PO-1050
(5/69)

UNITED STATES PATENT OFFICE
CERTIFICATE OF CORRECTION

Patent No. 3,593,272              Dated July 13, 1971

Inventor(s) Robert W. Blomenkamp and Enrique J. Klein

It is certified that error appears in the above-identified patent and that said Letters Patent are hereby corrected as shown below:

Column 4, Line 43; change "1ever" to --level--

Column 5, Line 51; after "and (5)," change "and" to --an--

Column 6, Line 24; after "signal," change "and" to --an--

Column 6, Line 57; change "shut" to --shunt--

Signed and sealed this 25th day of January 1972.

(SEAL)
Attest:

EDWARD M. FLETCHER, JR.          ROBERT GOTTSCHALK
Attesting Officer                  Commissioner of Patents